UNITED STATES PATENT OFFICE.

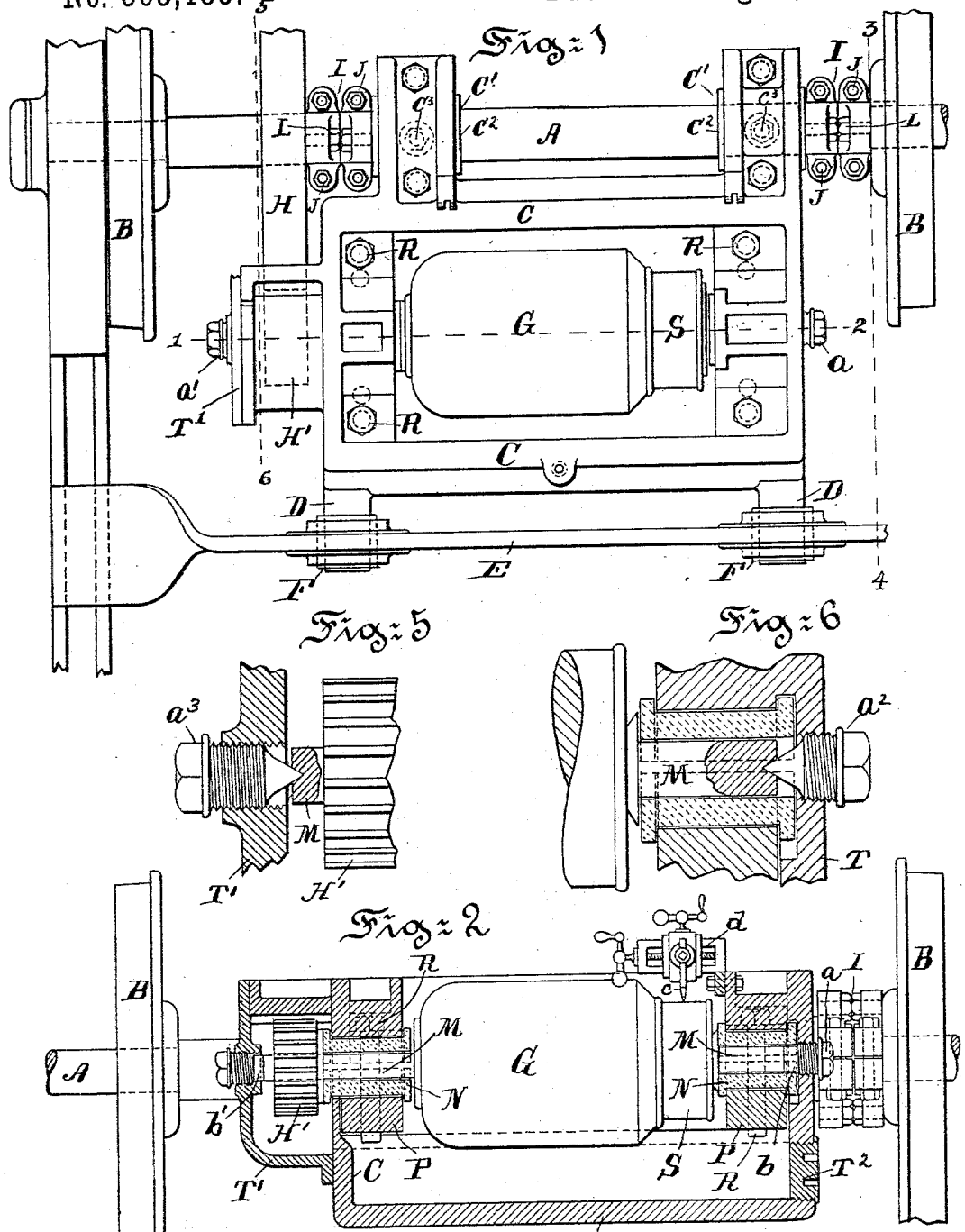

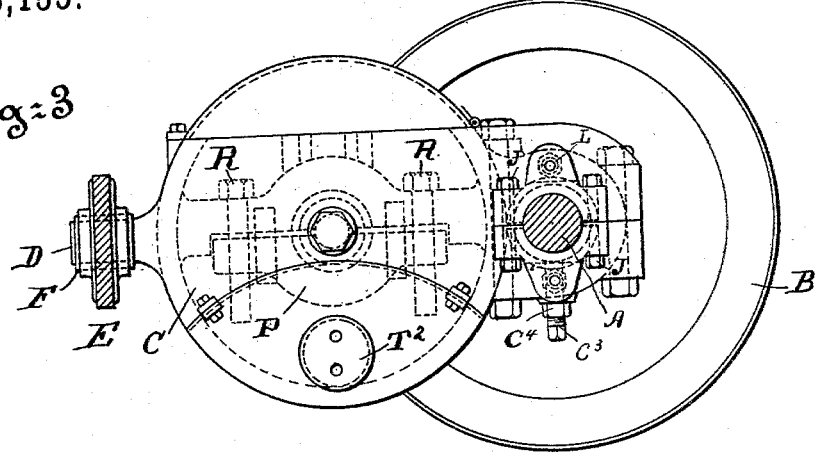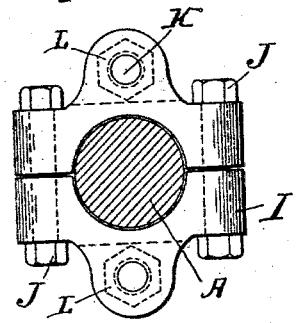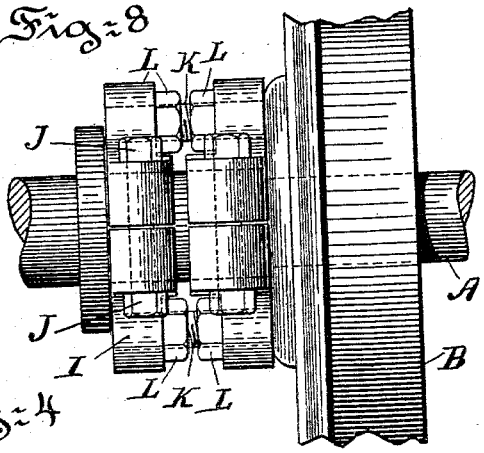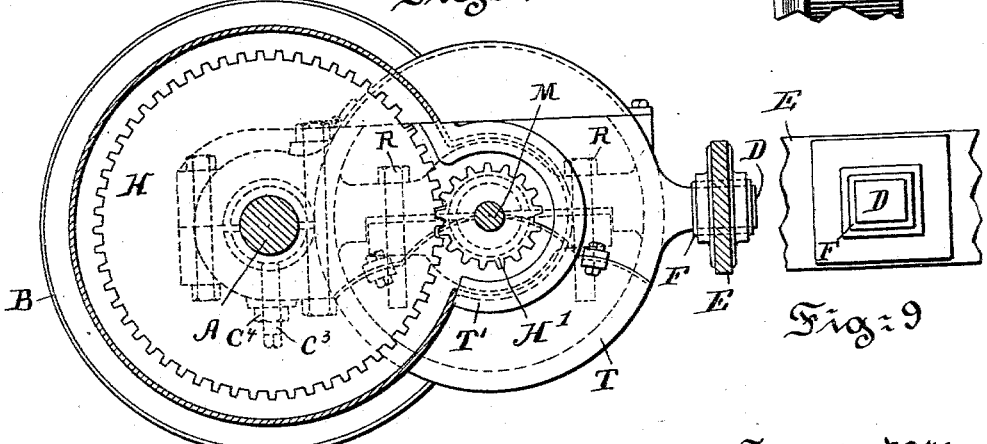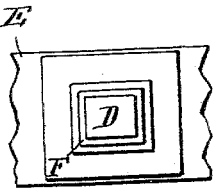

JOSEPH CONNER, JAMES R. MacMILLAN, AND ALLEN J. FULLER, OF PHILADELPHIA, PENNSYLVANIA.

ELECTRIC MOTOR.

SPECIFICATION forming part of Letters Patent No. 565,155, dated August 4, 1896.

Application filed September 17, 1895. Serial No. 562,763. (No model.)

*To all whom it may concern:*

Be it known that we, JOSEPH CONNER, JAMES R. MACMILLAN, and ALLEN J. FULLER, citizens of the United States, and residents of the city and county of Philadelphia, State of Pennsylvania, have invented certain new and useful Improvements in Electric Motors, of which the following is a specification.

Our invention relates to improvements in electric motors, and more particularly to improvements in devices for taking up the wear and preventing rattling in the working parts and journals of the motor and the frame which carries the motor.

Our invention relates, further, to improvements in devices whereby the commutator of the motor may be centered and turned off without it being necessary to remove the armature from the frame in which it is supported.

In the accompanying drawings, forming part of this specification, and in which similar letters of reference indicate similar parts throughout the several views, Figure 1 is a plan of an electric-car motor, one of the axles, part of the wheels and framing of the car, and the frame which carries the motor; Fig. 2, a section of Fig. 1 on line 1 2; Fig. 3, a section of Fig. 1 on line 3 4; Fig. 4, a section of Fig. 1 on line 5 6; Fig. 5, an enlarged elevation of part of the driving-pinion on armature-shaft and a centering-screw for centering this end of shaft when commutator is to be turned down, the inclosing case of pinion, which holds centering-screw, being shown in section. Fig. 6 is a similar view of the opposite or commutator end of armature-shaft, showing centering-screw; Fig. 7, a front elevation of device for preventing motor-frame from moving laterally on axle of car, and Fig. 8 a side elevation of Fig. 7 and part of the car axle and wheel.

A is the car-axle; B, the car-wheels.

C is the motor-carrying frame, one end of which is carried by axle A, as at C' C', and the other end of which is furnished with a lug or lugs D, which enter holes or sockets in a beam E, which is carried by the framing of the car and extends from one side of the car to the other.

In order to prevent rattling in the holes or sockets, the lugs D are covered with rubber or some other suitable substance F.

The frame C, which carries armature G, is usually furnished at one end with two bearings, as C' C', which are carried by the axle A. In order that these bearings may not slide laterally on the axle, we place on the axle, between the bearings C' or the brasses $C^2$, carried by the bearing in which the axle turns, and the hub of the wheel B or the hub of the gear-wheel H or some other suitable bearing fast to axle A, adjustable collars I, which prevent any lateral movement of frame C.

The adjustable collars I (best shown in Figs. 7 and 8) are arranged in pairs which are separated and held at any desired distance apart by means of screws K and check-nuts L. Each of the collars is split or divided diametrically into halves and provided with bolts and nuts J for connecting the two halves of each collar and clamping them tightly upon the shaft A. The outer faces of each pair of collars are square with the shaft and adapted to bear respectively against a fixed collar or bearing upon the shaft and the motor-frame or other part to be held against lateral movement. It will be evident that our expansible collars may be quickly applied to a shaft and that they may be afterward adjusted to take up wear at any time in a few minutes and without putting the car out of service. As shown in Fig. 1, we use two pairs of these collars, but in some instances one pair would be sufficient. With two pairs the motor-frame can be properly centered by adjusting the collars for the wear on both sides of the frame.

When the upper halves of the brasses $C^2$, carried by frame C, wear and the lower halves of these brasses are thereby lowered from the axle A, these lower halves of the brasses are raised by means of set-screws $C^3$, which pass through the under parts of the frame C, as shown in Figs. 3 and 4. This prevents any vertical movement or play of the frame C on the axle A. $C^4$ are nuts by means of which screws $C^3$ may be locked in place when properly adjusted.

The shaft M of armature G is carried in bearings or brasses N, which are carried by frame C. These brasses are split longitudinally, as is usual, and almost the entire wear takes place upon the lower part of the brass. This wear is rapid and has heretofore required a frequent renewal of the lower part of the brass. In order to take up this wear and preserve the original alinement of the shaft M of the armature, we place the lower parts of the brasses in yokes P, which are carried by threaded bolts R, which are carried by frame C and which pass down and through the ends of yokes P. When the lower brasses wear, the bolts R are turned, drawing up the yoke P and brasses N until the shaft M is in its original and proper position. This is important in order that teeth of gear H on axle A and teeth of pinion H' on shaft M may properly mesh.

Owing to the severe and constant work, the commutator S is rapidly and unevenly worn and requires turning down at intervals more or less frequent. Heretofore it has been the practice to remove the armature and carry it to a lathe for this purpose. We have furnished a device by means of which the shaft M may be centered and the commutator turned off without it being necessary to remove the armature from the machine.

T is a case (which may form part of the casting of frame C) which incloses the lower part of armature; T', a case which incloses pinion H'.

$a\ a'$, Figs. 1 and 2, are flat-ended screws passing through threaded holes in cases T T'.

$b\ b'$ are flat disks of steel interposed between the ends of screws $a\ a'$ and the ends of shaft M. These screws and disks (the latter of which may be done away with, if desired,) prevent any lateral movement of shaft M when the motor is in use.

When it is desired to turn off the commutator, screws $a\ a'$ are removed and their place is taken by the centering-screws $a^2\ a^3$, Figs. 5 and 6, the points of which enter centers in the ends of shaft M. The screws R are now loosened, the car is jacked up or the gears H H' disconnected, a turning-tool $c$, mounted on a suitable slide-rest $d$, is attached to frame C, and the armature and commutator are revolved in any suitable manner, and the commutator is turned off by the tool $c$.

When the lower brass N wears so much that is has to be removed, the shaft M may be held by screws $a^2\ a^3$ and yoke P may be lowered far enough to permit the brasses to be withdrawn.

$T^2$, Figs. 2 and 3, is a cap which closes a hand-hole through which the chips from turning-tool $c$ or dirt or dust may be removed from interior of case T.

Having thus described our invention, we claim—

1. The combination in an electric-motor car, of the axle, the motor-frame, one end of which is carried by said axle, and a fixed bearing also carried by the axle, of a device for preventing lateral movement of the motor-frame consisting of a pair of collars adjustably mounted on the axle between the fixed bearing and the motor-frame, means for adjusting said collars relatively to each other, and means for clamping the collars upon the axle, substantially as described.

2. The device for preventing lateral movement of or upon shafts or axles, consisting of a pair of split collars, each provided with a pair of bolts for clamping it to the shaft or axle, and adjusting screws and nuts interposed between the corresponding halves of the collars, whereby said collars may be adjusted relatively to each other and clamped upon the shaft or axle, substantially as described.

3. The combination in an electric-motor car, of the axle, the motor-frame supported at one end upon the axle, fixed bearings upon the axle outside of the motor-frame, and a device interposed between each bearing and the motor-frame for centering and preventing lateral movement of said frame, said devices each consisting of a pair of split collars, means for adjusting said collars relatively to each other upon the axle, and bolts for clamping the collars upon the axle, substantially as described.

4. The combination in an electric motor of an armature, a shaft, split brasses in which said shaft turns, a supporting-frame, as C, adjustable yokes for carrying the under parts of the brasses, and screws carried by said frame and passing into said yokes and by means of which said yokes and brasses may be raised or lowered, substantially as described.

JOSEPH CONNER.
JAMES R. MACMILLAN.
ALLEN J. FULLER.

Witnesses:
LEWIS WHITE,
A. M. DE HAVEN.